US011595836B2

(12) United States Patent
Sava et al.

(10) Patent No.: US 11,595,836 B2
(45) Date of Patent: Feb. 28, 2023

(54) CONFIGURATION OF A WIRELESS NETWORK CENTRALIZED UNIT (CU) AND MULTIPLE WIRELESS NETWORK DISTRIBUTED UNITS (DUS)

(71) Applicant: T-Mobile Innovations LLC, Overland Park, KS (US)

(72) Inventors: Herkole Sava, Centreville, VA (US); Ankit Arvind Muchhala, Leesburg, VA (US); Michael Scott Witherell, Portland, OR (US); Zheng Fang, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/496,166

(22) Filed: Oct. 7, 2021

(65) Prior Publication Data

US 2022/0030446 A1   Jan. 27, 2022

Related U.S. Application Data

(63) Continuation of application No. 16/745,156, filed on Jan. 16, 2020, now Pat. No. 11,190,955.

(51) Int. Cl.
*H04W 24/02* (2009.01)
*H04L 5/00* (2006.01)
*H04L 43/0888* (2022.01)

(52) U.S. Cl.
CPC ........... *H04W 24/02* (2013.01); *H04L 5/0053* (2013.01); *H04L 43/0888* (2013.01)

(58) Field of Classification Search
CPC ..... H04W 24/02; H04W 24/00; H04W 24/08; H04L 5/0053; H04L 43/0888
See application file for complete search history.

(56) References Cited

U.S. PATENT DOCUMENTS

| 10,206,166 | B2* | 2/2019 | Karaca ................. H04W 40/12 |
| 10,320,455 | B2 | 6/2019 | Forenza et al. |
| 10,432,291 | B2 | 10/2019 | Agiwal et al. |
| 2006/0041680 | A1 | 2/2006 | Proctor Jr. et al. |
| 2013/0188542 | A1 | 7/2013 | Merlin et al. |
| 2015/0023245 | A1 | 1/2015 | Du et al. |

(Continued)

FOREIGN PATENT DOCUMENTS

| WO | 2018009340 A1 | 1/2018 |
| WO | 2018166317 A1 | 9/2018 |

*Primary Examiner* — Keith Ferguson

(57) ABSTRACT

In a wireless communication network, a user Centralized Unit (CU) exchanges test data with user Distributed Units (DUs). The user DUs wirelessly exchange the test data with access DUs in wireless Access Points (APs). The access DUs exchange the test data with access CUs in the wireless APs. The user CU estimates data throughputs based on the test data for combinations of the user DUs, the access DUs, and the access CUs. The user CU selects a combination based on the estimated data throughputs. The user CU exchanges user data with the user communication devices and exchanges the user data with the user DUs in the selected combination. The user DUs in the selected combination wirelessly exchange the user data with the access DUs in the selected combination. The access DUs in the selected combination exchange the user data with the access CUs in the selected combination.

20 Claims, 7 Drawing Sheets

(56) References Cited

U.S. PATENT DOCUMENTS

| | | |
|---|---|---|
| 2016/0174255 A1 | 6/2016 | Birlik et al. |
| 2016/0183271 A1 | 6/2016 | Zhou et al. |
| 2016/0294455 A1 | 10/2016 | Forenza et al. |
| 2018/0368205 A1 | 12/2018 | Park et al. |
| 2019/0082367 A1 | 3/2019 | Lin et al. |
| 2020/0221343 A1 | 7/2020 | Henry et al. |

* cited by examiner

CONFIGURATION OF A WIRELESS NETWORK CENTRALIZED UNIT (CU) AND MULTIPLE WIRELESS NETWORK DISTRIBUTED UNITS (DUS)

RELATED CASES

This United States patent application is a continuation of U.S. patent application Ser. No. 16/745,156 that was filed on Jan. 16, 2020 and is entitled "CONFIGURATION OF A WIRELESS NETWORK CENTRALIZED UNIT (CU) AND MULTIPLE WIRELESS NETWORK DISTRIBUTED UNITS (DUS)." U.S. patent application Ser. No. 16/745,156 is hereby incorporated by reference into this United States patent application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access points that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN).

The wireless user devices process the wireless signals from the wireless communication networks to characterize the radio channel. The wireless user devices characterize the radio channel with metrics for the received wireless signals like strength, power, quality, noise, interference, and the like. The wireless user devices report the radio metrics to the wireless access points. The wireless access points process the radio metrics to perform several tasks. For example, the wireless access points process the received signal strength at the wireless user devices to control the transmit power of the wireless user devices.

The typical wireless access point comprises a radio and a baseband unit. The radio wirelessly interacts with the wireless user devices. The radio has circuitry like antennas, modulators, Digital Signal Processors (DSPs). The baseband unit drives the radio and forms a control point between the wireless user devices and the wireless communication network. The baseband unit has computer circuitry that performs tasks like error correction, channel equalization, network signaling, and Quality-of-Service (QoS). Some wireless access points use a network architecture that comprises Distributed Units (DUs) and a Centralized Unit (CU). The CU comprises at least part of the baseband unit. The DUs comprise and the radios and may be a portion of the baseband unit. Thus, the baseband unit may be distributed across the CU and the DU. A single CU may work with multiple DUs.

The wireless access point has been adapted for use in homes, schools, hospitals, factories, and the like. In some of these scenarios, the home access point is wirelessly coupled to a network access point in the wireless communication network. The home access point is also coupled to local user devices over wireless and/or wireline links. The home access point wirelessly exchanges user data with the wireless access points in wireless communication network. These home access points may also use the CU/DU architecture. The CU serves local user devices—typically over an Internet Protocol (IP) router. The CU drives one or more DUs, and the DUs wirelessly communicate with DUs in the wireless access points in the wireless communication network.

At-home installation of a wireless access point having a CU and multiple DUs is a challenge. The DUs are typically mounted on exterior walls, roofs, towers, and the like. The CU is typically in the home. Some of the DUs will have better wireless access to the wireless access points than other DUs. Some distributions of the baseband unit between the CU and DUs will have better performance than other baseband unit distributions.

Unfortunately, current wireless access points that use the CU/DU architecture do not effectively configure themselves based on their unique DU mounting locations and baseband distribution. Moreover, the current wireless access points for at-home or other similar uses do not efficiently configure their CU/DU architectures based on actual radio metrics.

TECHNICAL OVERVIEW

In a wireless communication network, a user Centralized Unit (CU) exchanges test data with user Distributed Units (DUs). The user DUs wirelessly exchange the test data with access DUs in wireless Access Points (APs). The access DUs exchange the test data with access CUs in the wireless APs. The user CU estimates data throughputs based on the test data for combinations of the user DUs, the access DUs, and the access CUs. The user CU selects a combination based on the estimated data throughputs. The user CU exchanges user data with the user communication devices and exchanges the user data with the user DUs in the selected combination. The user DUs in the selected combination wirelessly exchange the user data with the access DUs in the selected combination. The access DUs in the selected combination exchange the user data with the access CUs in the selected combination.

DETAILED DESCRIPTION

Figure 1:
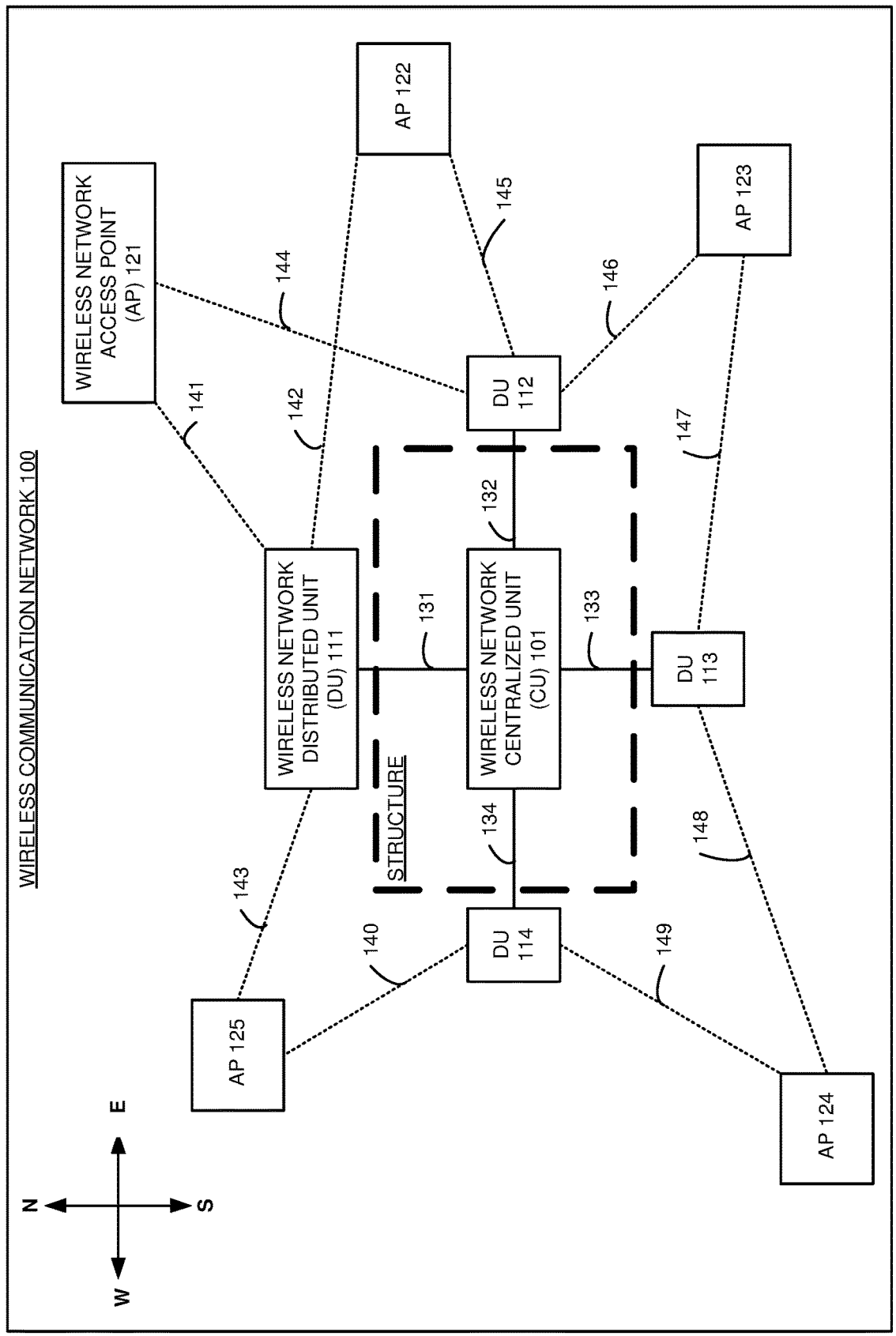
FIG. 1 illustrates a wireless communication network that automatically configures a wireless network Centralized Unit (CU) and multiple wireless network Distributed Units (DUs).

FIG. 1 illustrates wireless communication network 100 that automatically configures wireless network Centralized Unit (CU) 101 and multiple wireless network Distributed Units (DUs) 111-114. In wireless communication network 100, CU 101 serves user data appliances (not shown) with data services like internet-access, media-streaming, machine-control, or some other wireless networking product. The view of FIG. 1 is looking down from an elevation and the geographic directions are indicated at the upper left. The number of DUs is exemplary and may vary from two DUs to several DUs.

Wireless communication network 100 comprises wireless network CU 101, wireless network DUs 111-114, and wireless access points 121-125. Wireless network CU 101 is located in a structure like a home, office, fenced area, school, farm, or building. Wireless network DUs 111-114 are typically mounted externally on different sides of the structure although DUs 111-114 can be mounted anywhere. Wireless network APs 121-125 are located at various locations around the structure. The structure and the DU mounting locations are exemplary, and several different structures and mounting locations could be used.

Wireless network CU 101 and wireless network DU 111 are coupled over data communication link 131. CU 101 and DU 112 are coupled over data communication link 132. CU 101 and DU 113 are is coupled over data communication link 133. CU 101 and DU 114 are is coupled over data communication link 134. Data communication links 131-134 use Institute of Electrical and Electronic Engineers (IEEE) 802.3 (Ethernet), Time Division Multiplex (TDM), Data Over Cable System Interface Specification (DOCSIS), Internet Protocol (IP), Fifth Generation New Radio (5GNR), Long Term Evolution (LTE), IEEE 802.11 (WIFI), Low-Power Wide Area Network (LP-WAN) or some other data communication protocol. Data communication links 131-134 may transport Common Public Radio Interface (CPRI) or some other radio data interface between CU 101 and DUs 111-114.

Wireless network DU 111 and wireless network Access Point (AP) 121 are coupled over wireless communication link 141. DU 111 and AP 122 are coupled over wireless communication link 142. DU 111 and AP 125 are coupled over wireless communication link 143. DU 112 and AP 121 are coupled over wireless communication link 144. DU 112 and AP 122 are coupled over wireless communication link 145. DU 112 and AP 123 are coupled over wireless communication link 146. DU 113 and AP 123 are coupled over wireless communication link 147. DU 113 and AP 124 are coupled over wireless communication link 148. DU 114 and AP 124 are coupled over wireless communication link 149. DU 114 and AP 125 are coupled over wireless communication link 140. Wireless communication links 140-149 use 5GNR, LTE, WIFI, LP-WAN, or some other wireless communication protocol. Wireless communication links 140-149 use electromagnetic frequencies in the low-band, mid-band, high-band, or some other part of the electromagnetic spectrum.

Wireless network DUs 111-114 comprise antennas, filters, amplifiers, analog-to-digital interfaces, microprocessors, memory, software, transceivers, bus circuitry, and the like. Wireless network CU 101 comprises microprocessors, memory, software, transceivers, and bus circuitry, and the like. The microprocessors comprise Digital Signal Processors (DSP), Central Processing Units (CPUs), Graphical Processing Units (GPUs), Application-Specific Integrated Circuits (ASICs), Field Programable Gate Arrays (FPGAs), and/or the like. The memories comprise Random Access Memory (RAM), flash circuitry, disk drives, and/or the like. The memories store software like operating systems and network applications.

Wireless network DUs 111-114 receive test signals from wireless network APs 121-125. The test signals typically comprise wireless pilot signals from wireless network APs 121-125, although other wireless signals from network APs 121-125 could be used. Wireless network DUs 111-114 process the test signals to determine radio data like radio symbols and protocol data units. Wireless network DUs 111-114 transfer the radio data for the test signals to wireless network CU 101. Wireless network CU 101 processes the radio data to determine radio metrics like Received Signal Strength Indicator (RSSI), Received Signal Raw Power (RSRP), and Received Signal-to-Noise and Interference Ratio (SINR).

Wireless network CU 101 processes one or more of the radio metrics (RSSI, RSRP, SINR) to estimate data throughputs for combinations of DUs 111-114 and APs 121-125. For example, CU 101 may host a data structure that correlates technology (5GNR, LTE, WIFI, LP-WAN), RSS, RSRP, and SINR to an estimated average bytes per second on the downlink.

In this example, the 1:1 combinations which include one DU and one AP comprise: DU 111 and AP 121, DU 111 and AP 122, DU 111 and AP 125, DU 112 and AP 121, DU 112 and AP 122, DU 112 and AP 123, DU 113 and AP 123, DU 113 and AP 124, DU 114 and AP 124, DU 114 and AP 125. The N:1 combinations which include multiple DUs served by the same AP comprise: DUs 111-112 and AP 121, DUs 111-112 and AP 122, DUs 112-113 and AP 123, DUs 113-114 and AP 124, DUs 111/114 and AP 125. The 1:M combinations which include the same DU served by multiple APs comprise: DU 111 and APs 121/122/125, DU 112 and APs 121-123, DU 113 and APs 123-124, DU 114 and APs 124-125. N:M combinations include multiple DUs that are served by multiple APs.

Wireless network CU 101 selects and uses the best 1:1 combination if a 1:1 combination exceeds a service quality threshold. When none of the 1:1 combinations qualify, wireless network CU 101 selects and uses the best N:1 combination if an N:1 combination exceeds the service quality threshold. When none of the 1:1 combinations or the N:1 combinations qualify, wireless network CU 101 selects and uses the best 1:M combination if a 1:M combination if exceeds the service quality threshold. When none of the 1:1 combinations, N:1 combinations, 1:M combinations qualify, wireless network CU 101 selects and uses the best N:M combination if an N:M combination exceeds the service quality threshold. If none of these combinations qualify, then CU 101 selects the best combination and issues a service quality alarm.

Wireless network CU 101 exchanges user data with user communication devices. CU 101 exchanges the user data with the DU(s) in the selected combination. The DU(s) in the selected combination wirelessly exchanges the user data with the AP(s) in the selected combination. CU 101 may repeat the above DU configuration process on-demand, periodically, or responsive to poor data throughput.

Advantageously, CU 101 effectively configures itself and DUs 111-114 based on different DU mounting locations and baseband function distributions. Moreover, CU 101 efficiently configures itself and DUs 111-114 for at-home use or some other use based on actual radio metrics.

Figure 2:
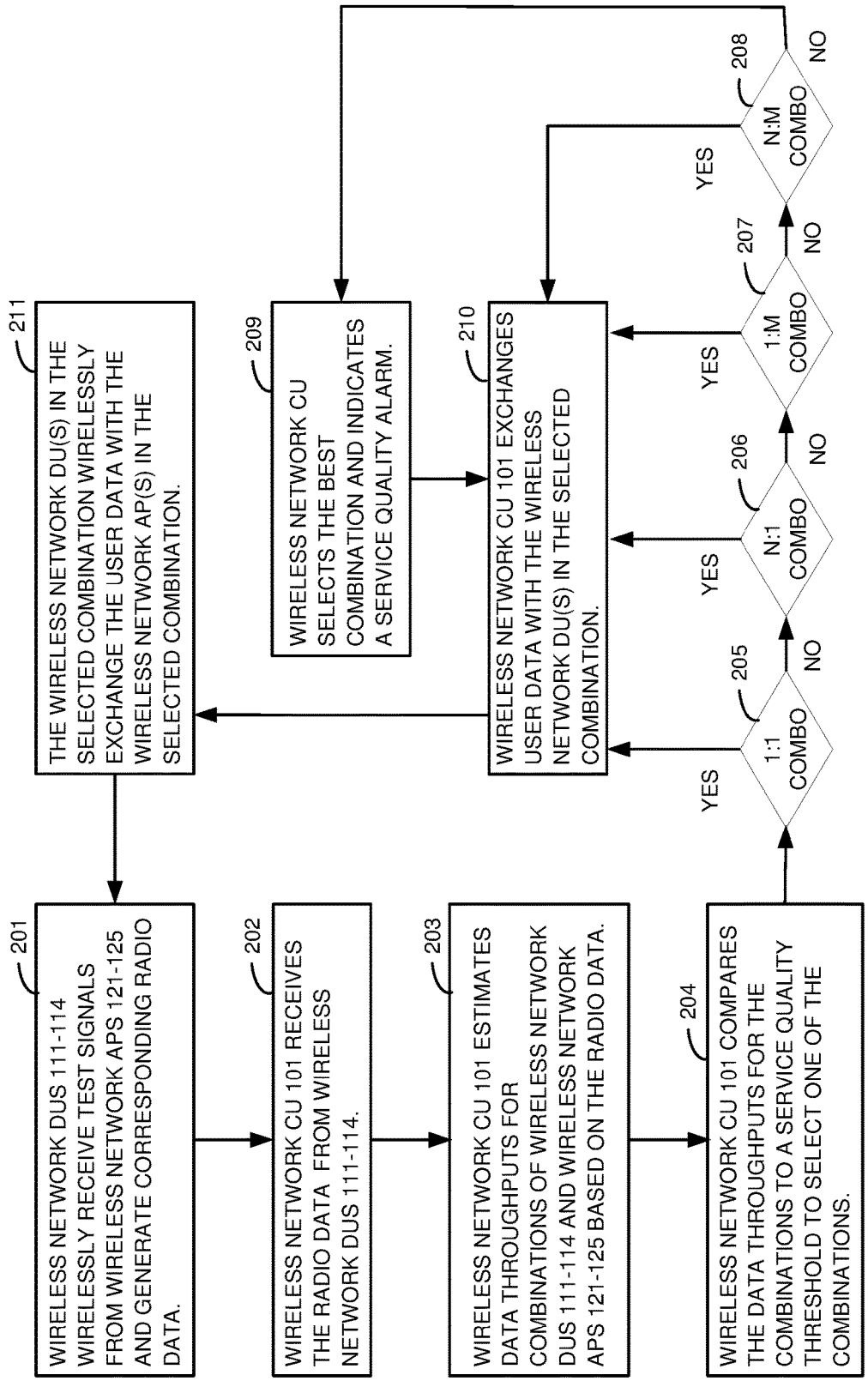
FIG. 2 illustrates the operation of the wireless communication network to automatically configure the wireless network CU and multiple wireless network DUs.

FIG. 2 illustrates the operation of wireless communication network 100 to automatically configure wireless network CU 101 and multiple wireless network DUs 111-114. Wireless network DUs 111-114 wirelessly receive test signals from wireless network APs 121-125 and generate corresponding radio data like radio symbols or protocol data units (201). Wireless network CU 101 receives the radio data from wireless network DUs 111-114 (202). Based on the radio data, wireless network CU 101 estimates data throughputs (203) for the 1:1 combinations (DU 111 and AP 121, DU 111 and AP 122, DU 111 and AP 125, DU 112 and AP 121, DU 112 and AP 122, DU 112 and AP 123, DU 113 and AP 123, DU 113 and AP 124, DU 114 and AP 124, DU 114 and AP 125). Wireless network CU 101 compares the estimated data throughputs for the 1:1 combinations to a service quality threshold (204) to select one of the 1:1 combinations when its estimated data throughput exceeds the service quality threshold (205).

If none of the 1:1 combinations are selected (205), then wireless network CU 101 estimates data throughputs for the N:1 combinations (DUs 111-112 and AP 121, DUs 111-112 and AP 122, DUs 112-113 and AP 123, DUs 113-114 and AP 124, DUs 111/114 and AP 125). Wireless network CU 101 compares the data throughputs for the N:1 combinations to the service quality threshold (204) to select one of the N:1 when its estimated data throughput exceeds the service quality threshold (206). If none of the N:1 combinations are selected (206), then wireless network CU 101 estimates data throughputs for 1:M combinations (DU 111 and APs 121/122/125, DU 112 and APs 121-123, DU 113 and APs 123-124, DU 114 and APs 124-125.) Wireless network CU 101 compares the data throughputs for the 1:M combinations to the service quality threshold (204) and selects one of the 1:M combinations when its estimated data throughput exceeds the service quality threshold (207). If none of the 1:M combinations are selected (207), then wireless network CU 101 estimates data throughputs for N:M combinations. Wireless network CU 101 compares the data throughputs for the N:M combinations to the service quality threshold (204) and selects one of the N:M combinations when its estimated data throughput exceeds the service quality threshold (208). In some examples, the operations for 1:M and N:M (207-208) may be combined or the 1:M operation (207) may be omitted.

If none of the combinations exceed the service quality threshold (205-208), then CU 101 selects the best combination and issues a service quality alarm (209). Wireless network CU 101 exchanges user data with the DU(s) in the selected combination (210). The wireless network DU(s) in the selected combination wirelessly exchange the user data with the wireless network AP(s) in the selected combination (211). The operation may repeat (201) on-demand, periodically, or responsive to poor data throughput.

Figure 3:
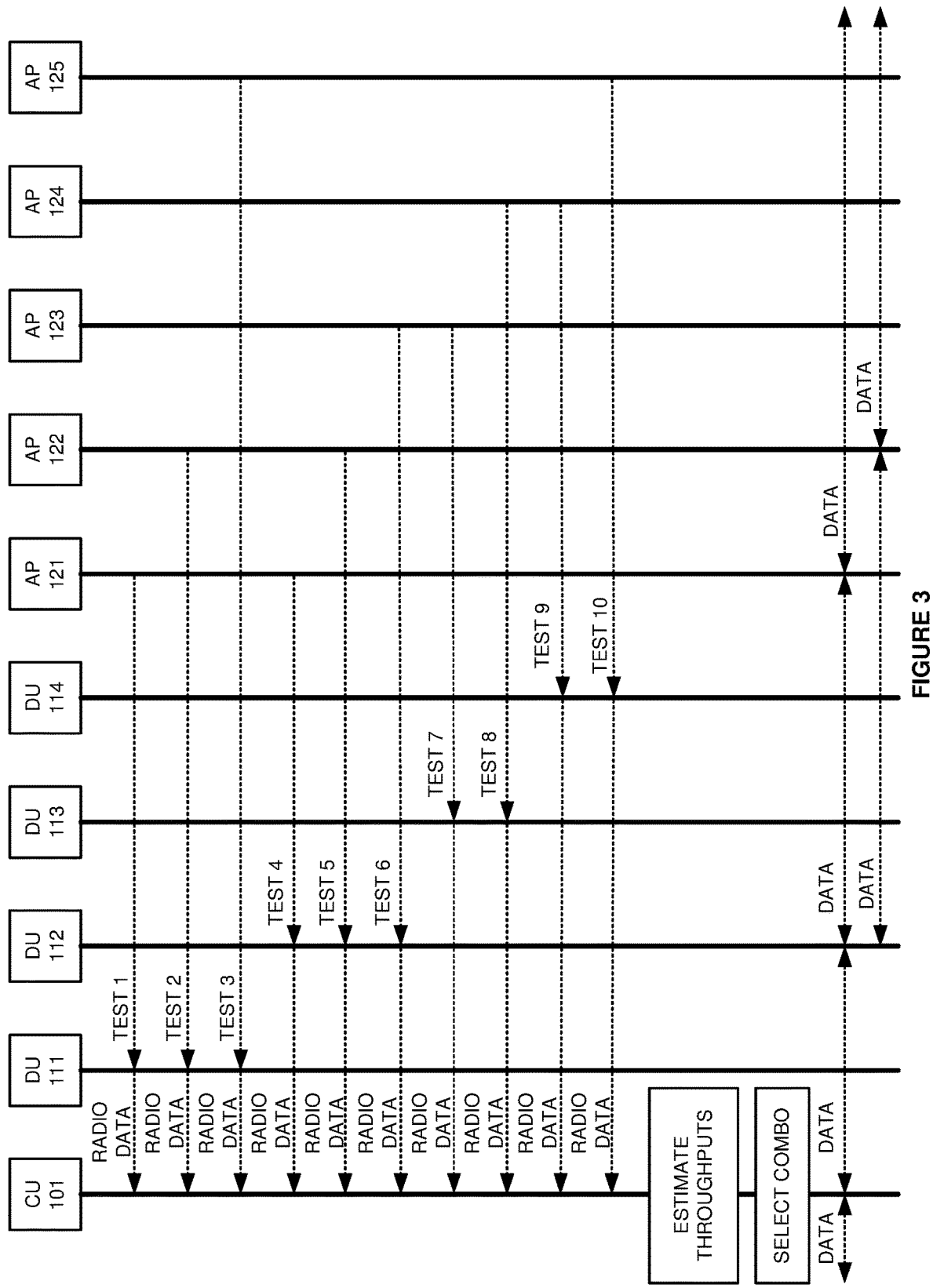
FIG. 3 illustrates the operation of the wireless communication network to automatically configure the wireless network CU and multiple wireless network DUs.

FIG. 3 illustrates the operation of wireless communication network 100 to automatically configure wireless network CU 101 and multiple wireless network DUs 111-114. In a first test (TEST 1), DU 111 wirelessly receives test signals from wireless network AP 121 and determines corresponding radio data like radio symbols and protocol data units. DU 111 transfers the radio data to CU 101. CU 101 processes the radio data to determine RSS, RSRP, and SINR. CU 101 processes RSS, RSRP, and SINR to estimate a corresponding data throughput based on the radio data.

In a second test (TEST 2), DU 111 wirelessly receives test signals from wireless network AP 122 and determines corresponding radio data. DU 111 transfers the radio data to CU 101, and CU 101 estimates a corresponding data throughput based on the radio data. In a third test (TEST 3), DU 111 wirelessly receives test signals from wireless network AP 125 and determines corresponding radio data. DU 111 transfers the radio data to CU 101, and CU 101 estimates a corresponding data throughput based on the radio data. In a fourth test (TEST 4), DU 112 wirelessly receives test signals from wireless network AP 121 and determines corresponding radio data. DU 112 transfers the radio data to CU 101, and CU 101 estimates a corresponding data throughput based on the radio data. In a fifth test (TEST 5), DU 112 wirelessly receives test signals from wireless network AP 122 and determines corresponding radio data. DU 112 transfers the radio data to CU 101, and CU 101 estimates a corresponding data throughput based on the radio data. In a sixth (TEST 6), DU 112 wirelessly receives test signals from wireless network AP 123 and determines corresponding radio data. DU 112 transfers the radio data to CU 101, and CU 101 estimates a corresponding data throughput based on the radio data. In a seventh test (TEST 7), DU 113 wirelessly receives test signals from wireless network AP 123 and determines corresponding radio data. DU 113 transfers the radio data to CU 101, and CU 101 estimates a corresponding data throughput based on the radio data. In an eighth test (TEST 8), DU 113 wirelessly receives test signals from wireless network AP 124 and determines corresponding radio data. DU 113 transfers the radio data to CU 101, and CU 101 estimates a corresponding data throughput based on the radio data. In a ninth test (TEST 9), DU 114 wirelessly receives test signals from wireless network AP 124 and determines corresponding radio data. DU 114 transfers the radio data to CU 101, and CU 101 estimates a corresponding data throughput based on the radio data. In a tenth test (TEST 10), DU 114 wirelessly receives test signals from wireless network AP 125 and determines corresponding radio data. DU 114 transfers the radio data to CU 101, and CU 101 estimates a corresponding data throughput based on the radio data.

Wireless network CU 101 initially estimates data throughputs for the 1:1 combinations (DU 111 and AP 121, DU 111 and AP 122, DU 111 and AP 125, DU 112 and AP 121, DU 112 and AP 122, DU 112 and AP 123, DU 113 and AP 123, DU 113 and AP 124, DU 114 and AP 124, DU 114 and AP 125). Wireless network CU 101 selects a 1:1 combination if one has adequate service quality, but in this example, no 1:1 combination is selected. Wireless network CU 101 then estimates data throughputs for the N:1 combinations (DUs 111-112 and AP 121, DUs 111-112 and AP 122, DUs 112-113 and AP 123, DUs 113-114 and AP 124, DUs 111/114 and AP 125). Wireless network CU 101 selects an N:1 combination if one has adequate service quality, but no N:1 combination is selected in this example. Wireless network CU 101 then estimates throughputs for 1:M combinations (DU 111 and APs 121/122/125, DU 112 and APs 121-123, DU 113 and APs 123-124, DU 114 and APs 124-125). Wireless network CU 101 selects a 1:M combination if one has adequate service quality. In this example, CU 101 selects the 1:M combination of DU 112 and APs 121-122 because that combination had an estimated data throughput that exceeded the service quality threshold. If the 1:M combinations did not have adequate service quality, then wireless network CU 101 would have estimated throughputs for N:M combinations and possibly select an N:M combination if one has adequate service quality. The 1:M and N:M operations could be integrated.

Wireless network CU 101 responsively exchanges user data with user communication devices (not shown). Wireless network CU 101 exchanges the user data with selected DU 112. Selected DU 112 wirelessly exchanges the user data with selected wireless network APs 121-122. Selected wireless network APs 121-122 exchange the user data with other network elements (not shown) to deliver the data communication services to the user communication devices.

Figure 4:
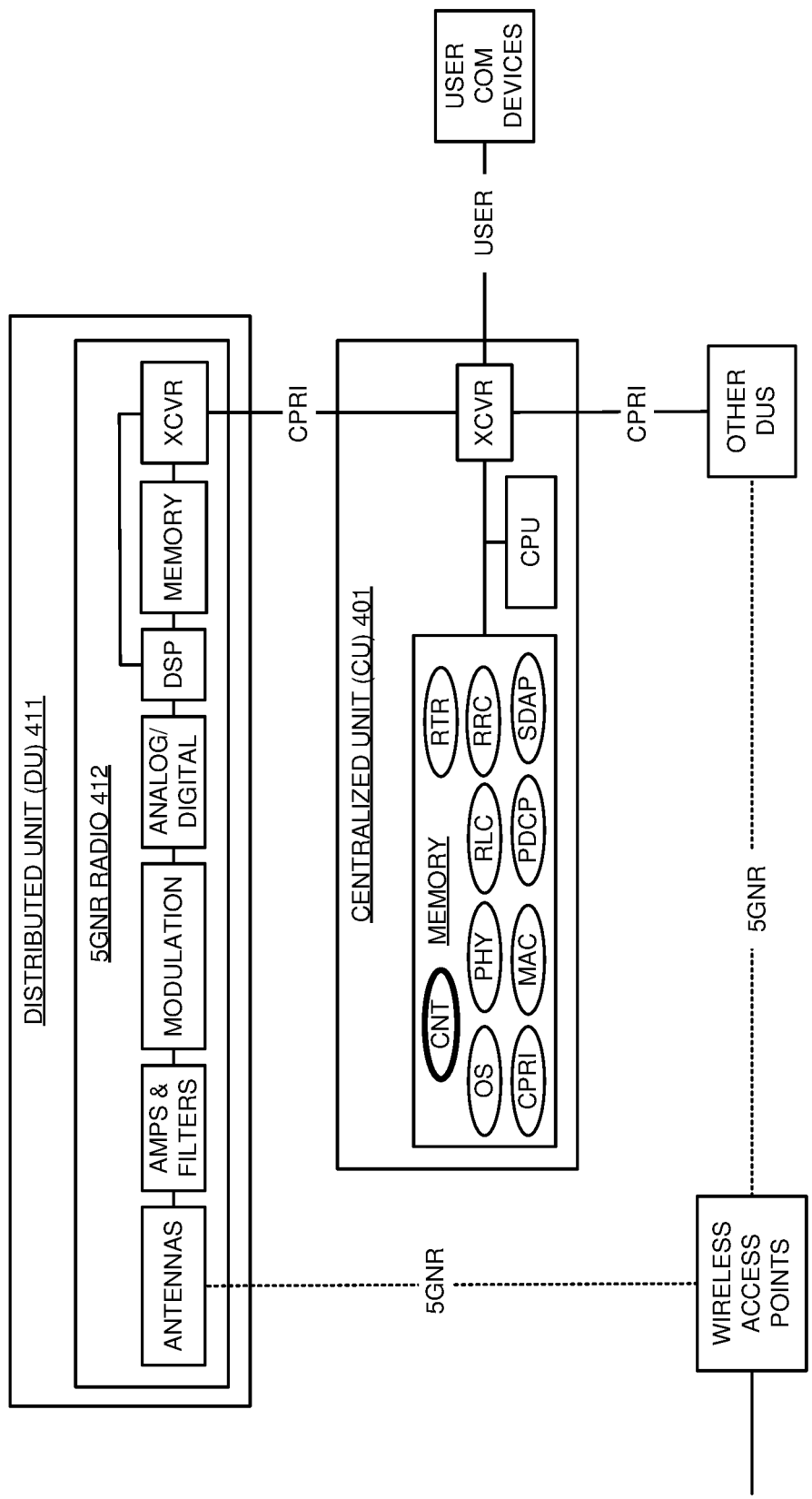
FIG. 4 illustrates a wireless network CU that automatically selects and configures wireless network DUs.

FIG. 4 illustrates wireless network CU 401 that automatically selects and configures wireless network DUs including DU 411. CU 401 and DU 411 are examples of CU 101 and DUs 111-114, although CU 101 and DUs 111-114 may differ. CU 401 comprises memory, Central Processing Units (CPU), and Transceivers (XCVR) that are coupled over bus circuitry. DU 411 includes 5GNR radio 412 which comprises antennas, amplifiers (AMPS), filters, modulation, analog-to-digital interfaces, Digital Signal Processors (DSP), and memory that are coupled over bus circuitry. DU 411 may have additional radios that use other technologies and/or frequency bands. The antennas in 5GNR radio 412 are wirelessly coupled to wireless access points over 5GNR links. The XCVR in 5GNR DU 411 is coupled to the XCVR in CU 401 over CPRI links. The XCVR in CU 401 is coupled to other DUs over CPRI links. The XCVR in CU 401 is coupled to user communication devices over user data links.

In CU 401, the memory stores network applications for 5GNR CPRI, 5GNR Physical Layer (PHY), 5GNR Media Access Control (MAC), 5GNR Radio Link Control (RLC), 5GNR Packet Data Convergence Protocol (PDCP), 5GNR Radio Resource Control (RRC), 5GNR Service Data Adaptation Protocol (SDAP), Internet Protocol Router (RTR), and network architecture control (CNT). In DU 411, the memory stores operating system (OS), and network applications for 5GNR DSP and 5GNR CPRI. The CPU in CU 401 executes the 5GNR network applications to drive the exchange of data and signaling between the user communication devices and the DUs—including DU 411. In DU 411, the DSP executes the DSP applications to drive the exchange of data and signaling between CU 401 and the wireless access points over 5GNR radio 412. 5GNR Radio 412 wirelessly exchanges the data and signaling with the wireless access points over 5GNR links.

In 5GNR radio 412, the antennas receive wireless 5GNR signals from the wireless access points that transport the Downlink (DL) 5GNR signaling and DL 5GNR data. The antennas transfer corresponding electrical DL signals through duplexers to the amplifiers. The amplifiers boost the received DL electrical signals for filters which attenuate unwanted energy. In modulation, demodulators down-convert the DL electrical signals from their carrier frequency. The analog/digital interfaces convert the analog DL signals into digital DL signals for the DSP. The DSP recovers DL 5GNR symbols from the DL digital signals. The DSP transfers the DL 5GNR symbols to the 5GNR PHY in CU 401 over the CPRI link.

In CU 401, the CPU executes the network applications to process the DL 5GNR symbols and recover the DL 5GNR signaling and DL 5GNR data. The PHY performs channel estimation to determine radio metrics like RSSI, RSRP, and SINR. The CPU executes the 5GNR RRC to process the DL 5GNR signaling and Uplink (UL) user signaling to generate UL 5GNR signaling and DL user signaling. The 5GNR SDAP interworks between the 5GNR data and the user data on the UL and the DL. The 5GNR RRC transfers the DL user signaling over the IP router to the user communication devices. The 5GNR SDAP transfers the DL user data over the IP router to the user communication devices. The 5GNR RRC receives the UL user signaling over the IP router from the user communication devices. The 5GNR SDAP receives the UL user data over the IP router from the user communication devices.

In CU 401, the CPU executes the 5GNR PDCP, RLC, MAC, and PHY to process the UL 5GNR signaling and the UL 5GNR data to generate UL 5GNR symbols. The 5GNR PHY in CU 401 transfers the UL 5GNR symbols to 5GNR radio 412 in DU 411 over the CPRI link. In DU 411, the DSP converts the UL 5GNR symbols into corresponding UL digital signals for the analog/digital interfaces. The analog/digital interfaces convert the UL digital signals into UL analog signals for modulation. In modulation, modulators up-convert the UL analog signals to their carrier frequency. The amplifiers boost the UL analog signals for filters which attenuate unwanted energy. The antennas emit 5GNR signals that correspond to the modulated UL analog signals. The wireless 5GNR signals transport the UL 5GNR signaling and UL 5GNR data to the wireless access points.

RRC functions comprise authentication, security, handover control, status reporting, QoS, network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARQ), MIMO, user identification, random access, user scheduling, and QoS. PHY functions comprise MIMO, packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

The 5GNR PHY in CU 401 transfers RSSI, RSRP, and SINRs for the 1:1 combinations to the network architecture control application (CNT) over the 5GNR RRC. The network architecture control application in CU 401 estimates data throughputs for the 1:1 combinations based on the RSSI, RSRP, and SINR data. The network architecture control application may use a data structure or scoring algorithm to process the RSSI, RSRP, and SINR to estimate the data throughputs. The network architecture control application selects the best 1:1 combination if any of the 1:1 combinations exceed a service quality threshold.

When no 1:1 combinations are selected, the network architecture control application in CU 401 processes the RSSI, RSRP, and SINR for the N:1 combinations to estimate data throughputs for the N:1 combinations. The network architecture control application selects the best N:1 combination if any N:1 combination exceeds the service quality threshold. When no 1:1 combinations and no N:1 combinations are selected, the network architecture control application processes the RSSI, RSRP, and SINR for the 1:M combinations to estimate data throughputs for the 1:M combinations. The network control application in CU 401 selects one of the 1:M combinations if the 1:M combination exceeds the service quality threshold. When no 1:1, N:1, or 1:M combinations are selected, the network architecture control application processes the RSSI, RSRP, and SINR for the 1:M combinations to estimate data throughputs for the N:M combinations. The network control application in CU 401 selects one of the N:M combinations if the N:M combination exceeds the service quality threshold. If none of the combinations exceed the service quality threshold, then the network architecture control application selects the best combination and issues a service quality alarm.

The network architecture control application transfers the selected combination of DU(s) and AP(s) to the 5GNR RRC and the 5GNR SDAP. The 5GNR RRC and the 5GNR SDAP in CU 401 exchange user data and signaling with the user communication devices over the IP router. The 5GNR network applications in CU 401 exchange 5GNR signaling and 5GNR data with the DU(s) in the selected combination. The DU(s) in the selected combination wirelessly exchange the 5GNR signaling and 5GNR data with the wireless access point(s) in the selected combination. CU 401 may repeat the above network architecture configuration process on demand, periodically, or responsive to poor data throughput.

Figure 5:
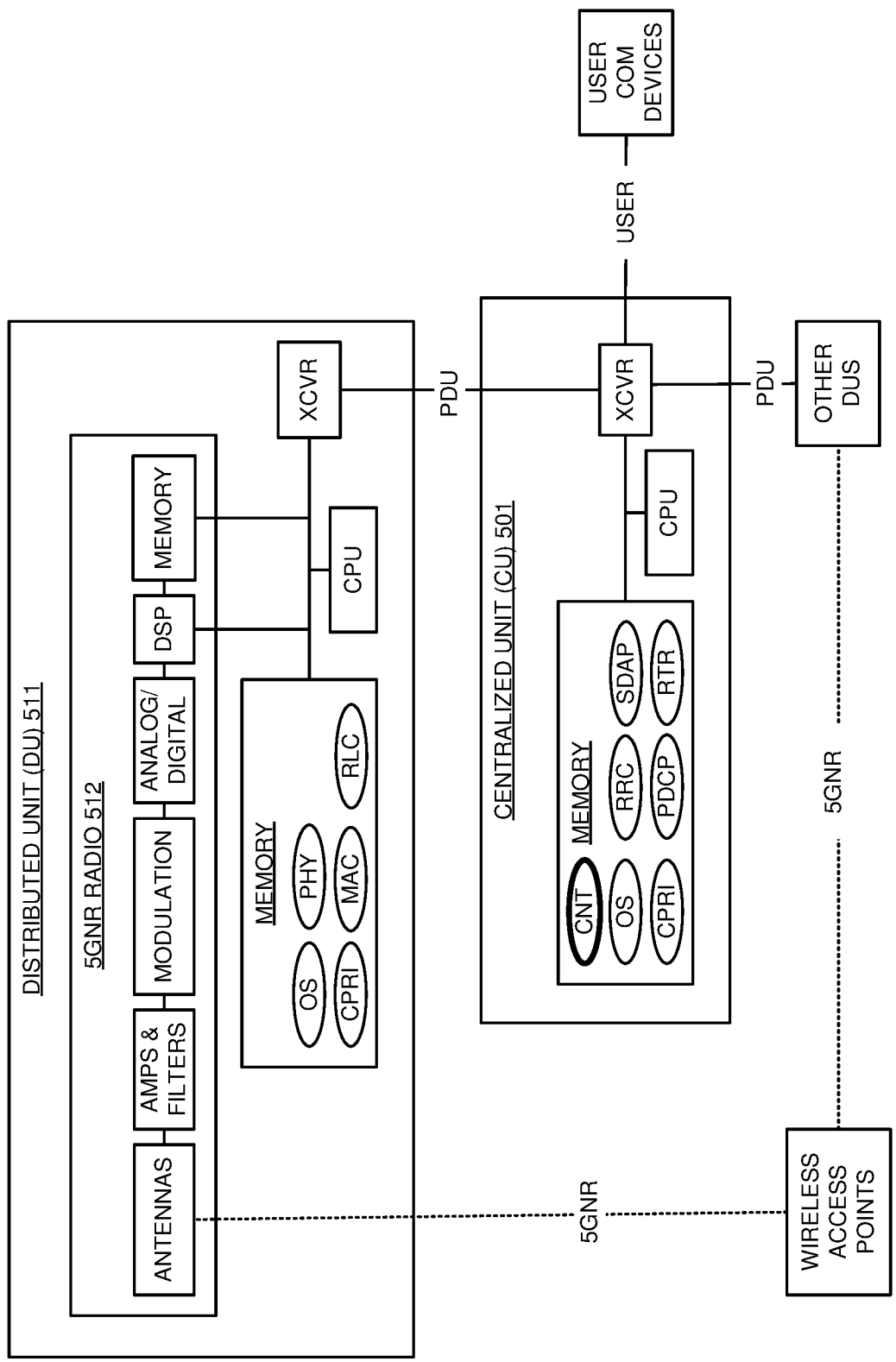
FIG. 5 illustrates another wireless network CU that automatically selects and configures wireless network DUs.

FIG. 5 illustrates wireless network CU 501 that automatically selects and configures a combination of wireless network DUs including DU 511. CU 501 and DU 511 are examples of CU 101 and DUs 111-114, although CU 101 and DUs 111-114 may differ. CU 501 comprises memory, CPU, and XCVR that are coupled over bus circuitry. DU 511 includes 5GNR radio 512 which comprises antennas, amplifiers, filters, modulation, analog-to-digital interfaces, DSP, and memory that are coupled over bus circuitry. DU 511 may have additional radios that use additional frequency bands and technologies. The antennas in 5GNR radio 512 are wirelessly coupled to wireless access points over 5GNR links. The XCVR in 5GNR DU 511 is coupled to the XCVR in CU 501 over 5GNR PDU links. The XCVR in CU 501 is coupled to other DUs over 5GNR PDU links. The XCVR in CU 501 is coupled to user communication devices over user data links.

In CU 501, the memory stores network applications for 5GNR CPRI, 5GNR PDCP, 5GNR RRC, 5GNR SDAP, IP router, and network architecture control (CNT). In DU 511, the memory stores operating system, and network applications for 5GNR DSP, 5GNR CPRI, 5GNR PHY, 5GNR MAC, and 5GNR RLC. The CPU in CU 501 executes the network applications to drive the exchange of user data and signaling with the user communication devices and to drive the exchange of 5GNR PDUs with the DUs—including DU 511. In DU 511, the CPU executes the network applications to drive the exchange of 5GNR PDUs with CU 501 and to drive the exchange of 5GNR symbols with the DSP. In 5GNR radio 512, the DSP executes the DSP applications to drive the exchange of 5GNR symbols with 5GNR radio 512. 5GNR radio 512 wirelessly exchanges the 5GNR data and 5GNR signaling with the wireless access points over 5GNR links.

In 5GNR radio 512, the antennas receive wireless 5GNR signals from the wireless access points that transport the Downlink (DL) 5GNR signaling and DL 5GNR data. The antennas transfer corresponding electrical DL signals through duplexers to the amplifiers. The amplifiers boost the received DL electrical signals for filters which attenuate unwanted energy. In modulation, demodulators down-convert the DL electrical signals from their carrier frequency. The analog/digital interfaces convert the analog DL signals into digital DL signals for the DSP. The DSP recovers DL 5GNR symbols from the DL digital signals. The DSP transfers the DL 5GNR symbols to the 5GNR PHY in DU 511 over the bus circuitry.

In DU 511, the CPU executes the network applications (5GNR PHY, MAC, RLC) to process the DL 5GNR symbols and recover the DL 5GNR signaling and DL 5GNR data. The PHY performs channel estimation to determine radio metrics like RSSI, RSRP, and SINR. The 5GNR RLC transfers PDUs that carry the DL 5GNR data and the DL 5GNR signaling to the 5GNR PDCP in CU 501.

In CU 501, the CPU executes the 5GNR RRC to process the DL 5GNR signaling and Uplink (UL) user signaling to generate UL 5GNR signaling and DL user signaling. The 5GNR SDAP interworks between the 5GNR data and the user data on the UL and the DL. The 5GNR RRC transfers the DL user signaling over the IP router to the user communication devices. The 5GNR SDAP transfers the DL user data over the IP router to the user communication devices. The 5GNR RRC receives the UL user signaling over the IP router from the user communication devices. The 5GNR SDAP receives the UL user data over the IP router from the user communication devices. The 5GNR PDCP in CU 501 transfers PDUs that transport the UL 5GNR data and UL 5GNR signaling to the 5GNR RLC in DU 512.

In DU 512, the CPU executes the 5GNR network applications (RLC, MAC, and PHY) to process the UL 5GNR signaling and the UL 5GNR data to generate UL 5GNR symbols. The 5GNR PHY in DU 511 transfers the UL 5GNR symbols to 5GNR radio 512. In DU 511, the DSP converts the UL 5GNR symbols into corresponding UL digital signals for the analog/digital interfaces. The analog/digital interfaces convert the UL digital signals into UL analog signals for modulation. In modulation, modulators up-convert the UL analog signals to their carrier frequency. The amplifiers boost the UL analog signals for filters which attenuate unwanted energy. The antennas emit 5GNR signals that correspond to the modulated UL analog signals. The wireless 5GNR signals transport the UL 5GNR signaling and UL 5GNR data to the wireless access points.

The 5GNR PHY in DU 511 transfers the RSSI, RSRP, and SINRs for the 1:1 combinations to the network architecture control application (CNT) over the PDUs and 5GNR RRC. The network architecture control application in CU 501 estimates data throughputs for the 1:1 combinations based on the RSSI, RSRP, and SINR data. The network architecture control application may use a data structure or scoring algorithm to process the RSS, RSRP, and SINR to estimate the data throughputs. The network architecture control application selects the best 1:1 combination if any of the 1:1 combinations exceed the service quality threshold.

When no 1:1 combinations are selected, the network architecture control application in CU 401 processes the RSSI, RSRP, and SINR for the N:1 combinations to estimate data throughputs for the N:1 combinations. The network architecture control application selects the best N:1 combination if any N:1 combination exceeds the service quality threshold. When no 1:1 combinations and no N:1 combinations are selected, the network architecture control application processes the RSSI, RSRP, and SINR for the 1:M combinations to estimate data throughputs for the 1:M combinations. The network control application in CU 401 selects one of the 1:M combinations if the 1:M combination exceeds the service quality threshold. When no 1:1, N:1, or 1:M combinations are selected, the network architecture control application processes the RSSI, RSRP, and SINR for the 1:M combinations to estimate data throughputs for the N:M combinations. The network control application in CU 401 selects one of the N:M combinations if the N:M combination exceeds the service quality threshold. If none of the combinations exceed the service quality threshold, then the network architecture control application selects the best combination and issues a service quality alarm.

The network architecture control application transfers the selected combination of DU(s) and AP(s) to the 5GNR RRC and the 5GNR SDAP. The 5GNR RRC and the 5GNR SDAP in CU 401 exchange user data and signaling with the user communication devices over the IP router. The 5GNR network applications in CU 501 exchange 5GNR signaling and 5GNR data with the DU(s) in the selected combination—including DU 511. The DU(s) in the selected combination wirelessly exchange the 5GNR signaling and 5GNR data with the wireless access point(s) in the selected combination. CU 501 may repeat the above network architecture configuration process on demand, periodically, or responsive to poor data throughput.

Figure 6:
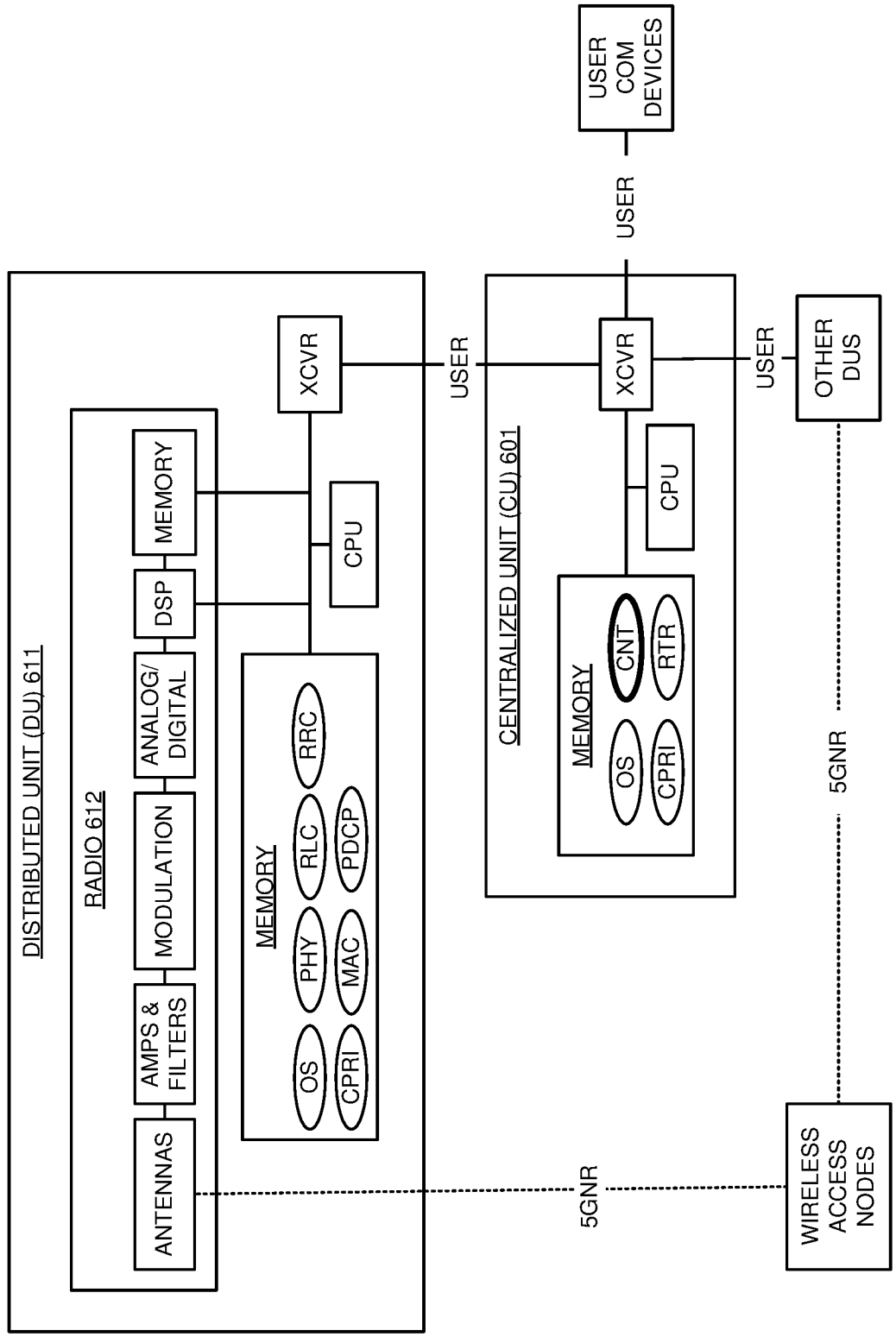
FIG. 6 illustrates another wireless network CU that automatically selects and configures wireless network DUs.

FIG. 6 illustrates wireless network CU 601 that automatically selects and configures a combination of wireless network DUs including DU 611. CU 601 and DU 611 are examples of CU 101 and DUs 111-114, although CU 101 and DUs 111-114 may differ. CU 601 comprises memory, CPU, and XCVR that are coupled over bus circuitry. DU 611 includes 5GNR radio 612 which comprises antennas, amplifiers, filters, modulation, analog-to-digital interfaces, DSP, and memory that are coupled over bus circuitry. DU 611 may have additional radios that use additional frequency bands and technologies. The antennas in 5GNR radio 612 are wirelessly coupled to wireless access points over 5GNR links. The XCVR in 5GNR radio 612 is coupled to the XCVR in CU 601 over 5GNR PDU links. The XCVR in CU 601 is coupled to other DUs over 5GNR PDU links. The XCVR in CU 601 is coupled to user communication devices over user data links.

In CU 501, the memory stores network applications for 5GNR CPRI, IP router, and network architecture control (CNT). In DU 511, the memory stores operating system, and network applications for 5GNR DSP, 5GNR CPRI, 5GNR PHY, 5GNR MAC, 5GNR RLC, 5GNR PDCP, 5GNR RRC, and 5GNR SDAP. The CPU in CU 501 executes the network applications (IP router and CPRI) to drive the exchange of user data and signaling between the user communication devices and the DUs—including DU 511. In DU 511, the CPU executes the 5GNR network applications (RRC, SDAP, PDCP, RLC, MAC, PHY) to drive the exchange of user data and signaling with the IP router in CU 601 and to drive the exchange of 5GNR symbols that represent 5GNR data and 5GNR signaling with 5GNR radio 612. In DU 611, the 5GNR DSP executes the DSP applications to drive the exchange of 5GNR symbols between the 5GNR PHY and 5GNR radio 612. 5GNR radio 612 wirelessly exchanges the 5GNR data and 5GNR signaling with the wireless access points over 5GNR links.

In 5GNR radio 612, the antennas receive wireless 5GNR signals from the wireless access points that transport the DL 5GNR signaling and DL 5GNR data. The antennas transfer corresponding electrical DL signals through duplexers to the amplifiers. The amplifiers boost the received DL electrical signals for filters which attenuate unwanted energy. In modulation, demodulators down-convert the DL electrical signals from their carrier frequency. The analog/digital interfaces convert the analog DL signals into digital DL signals for the DSP. The DSP recovers DL 5GNR symbols from the DL digital signals. The DSP transfers the DL 5GNR symbols to the 5GNR PHY in DU 611 over the bus circuitry. In DU 611, the CPU executes the network applications (5GNR PHY, MAC, RLC, PDCP, RRC, SDAP) to process the DL 5GNR symbols and recover the DL user signaling and DL user data. The PHY performs channel estimation to determine radio metrics like RSSI, RSRP, and SINR.

In DU 611, the CPU executes the 5GNR RRC to process the DL 5GNR signaling and UL user signaling to generate UL 5GNR signaling and DL user signaling. The 5GNR SDAP interworks between the 5GNR data and the user data on the UL and the DL. The 5GNR RRC in DU 611 transfers the DL user signaling to the user communication devices over the IP router in CU 601. The 5GNR SDAP in DU 611 transfers the DL user data to the user communication devices over the IP router in CU 601. The 5GNR RRC in DU 611 receives the UL user signaling from the user communication devices over the IP router in CU 601. The 5GNR SDAP in DU 611 receives the UL user data from the user communication devices over the IP router in CU 601.

In DU 611, the CPU executes the 5GNR network applications (RRC, SDAP, PDCP, RLC, MAC, and PHY) to process the UL user signaling and the UL user data to generate UL 5GNR symbols. The 5GNR PHY in DU 611 transfers the UL 5GNR symbols to 5GNR radio 612. In DU 611, the DSP converts the UL 5GNR symbols into corresponding UL digital signals for the analog/digital interfaces. The analog/digital interfaces convert the UL digital signals into UL analog signals for modulation. In modulation, modulators up-convert the UL analog signals to their carrier frequency. The amplifiers boost the UL analog signals for filters which attenuate unwanted energy. The antennas emit 5GNR signals that correspond to the modulated UL analog signals. The wireless 5GNR signals transport the UL 5GNR signaling and UL 5GNR data to the wireless access points.

The 5GNR PHY in DU 611 transfers the RSSI, RSRP, and SINRs for the 1:1 combinations to the network architecture control application (CNT) over the 5GNR RRC. The network architecture control application in CU 601 estimates data throughputs for the 1:1 combinations based on the RSSI, RSRP, and SINR data. The network architecture control application may use a data structure or scoring algorithm to process the RSSI, RSRP, and SINR to estimate the data throughputs. The network architecture control application selects the best 1:1 combination if any of the 1:1 combinations exceed the service quality threshold.

When no 1:1 combinations are selected, the network architecture control application processes the RSS, RSRP, and SINR for the 1:M combinations to estimate data throughputs for the 1:M combinations. The network control application in CU 601 selects one of the 1:M combinations if the 1:M combination exceeds the service quality threshold. If none of the 1:1 or 1:M combinations exceed the service quality threshold, then the network architecture control application selects the best combination and issues a service quality alarm.

The network architecture control application in CU 601 transfers the selected combination of DU(s) and AP(s) to the 5GNR RRC and the 5GNR SDAP in the selected DUs including DU 611. The 5GNR RRC and the 5GNR SDAP in DU 611 exchange user data and signaling with the user communication devices over the IP router in CU 601. The DU(s) in the selected combination wirelessly exchange the 5GNR signaling and 5GNR data with the wireless access point(s) in the selected combination. CU 601 may repeat the network architecture configuration process on demand, periodically, or responsive to poor data throughput.

Figure 7:
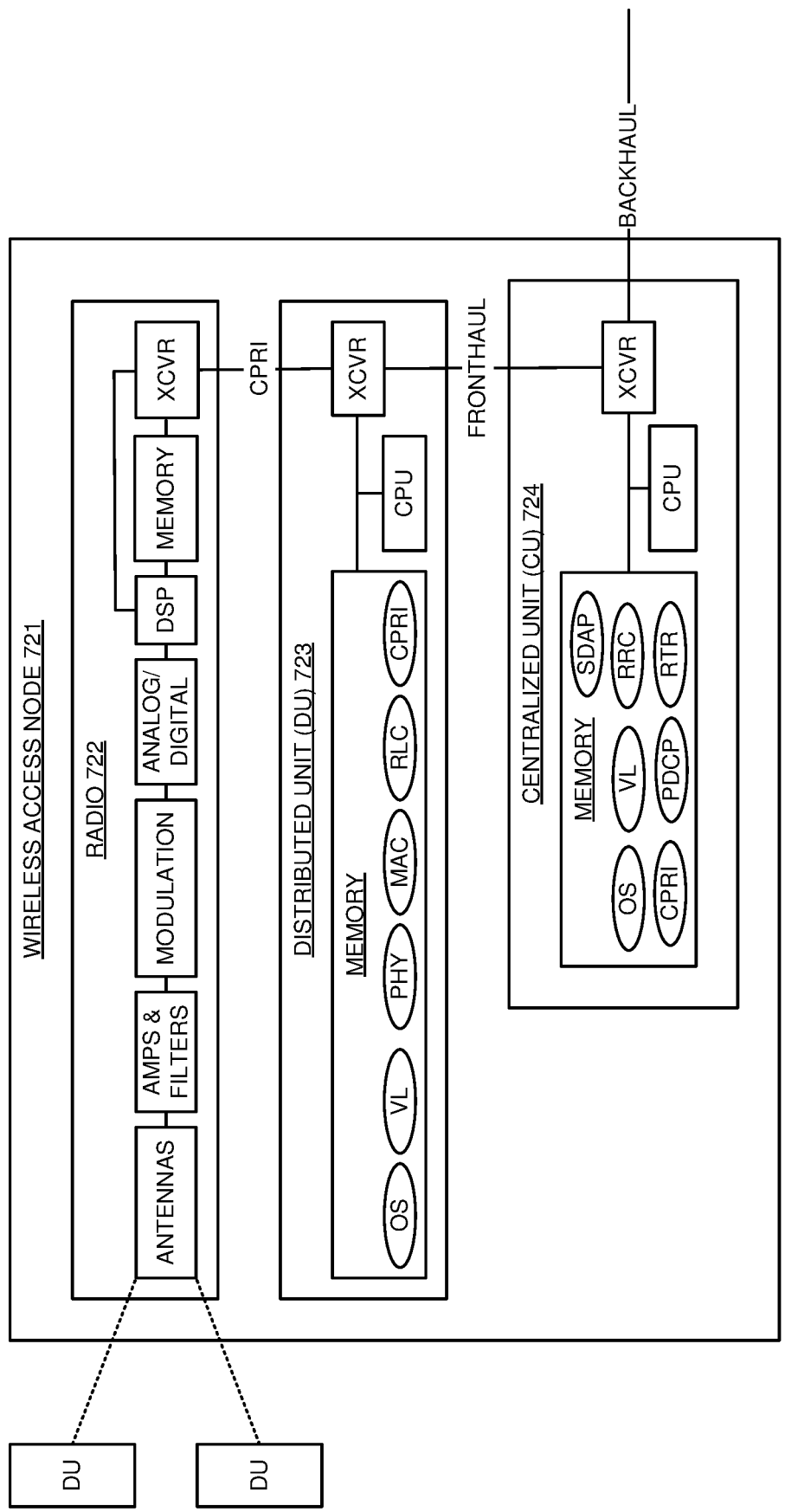
FIG. 7 illustrates a wireless network AP that serves wireless network DUs.

FIG. 7 illustrates wireless network AP 721 that serves wireless network DUs. Wireless access point 721 is an example of wireless access points 121-125, although access points 121-125 may differ. Wireless access point 721 comprises radio 722, Distributed Unit (DU) 723, and Centralized Unit (CU) 724. Radio 722 comprises antennas, amplifiers, filters, modulation, analog-to-digital interfaces, DSP, and memory that are coupled over bus circuitry. DU 723 comprises memory, CPU, and XCVR that are coupled over bus circuitry. CU 724 comprises memory, CPU, and XCVR that are coupled over bus circuitry. The DUs are wirelessly coupled to the antennas in radio 722. The XCVR in radio 722 is coupled to the XCVR in DU 723 over CPRI links. The XCVR in DU 723 is coupled to the XCVR in CU 724 over fronthaul links. The XCVR in CU 724 is coupled to packet gateways and network controllers over backhaul links.

In DU 723, the memory stores operating system, virtual layer (VL), and several network applications like PHY, MAC, RLC, and CPRI. In CU 724, the memory stores an operating system, virtual layer, and several network applications like PDCP, RRC, and SDAP. The virtual layers comprise hypervisors, virtual switches, virtual CPUs, virtual memory and/or the like. The CPU in CU 724 executes the network applications to drive the exchange of user data and network signaling between the network elements and DU 723. The CPU in DU 723 executes the network applications to drive the exchange of user data and network signaling between CU 724 and radio 722. Radio 722 exchanges user data and network signaling with the DUs.

In radio 722, the antennas receive wireless signals from the DUs that transport the UL signaling and data. The antennas transfer corresponding electrical UL signals through duplexers to the amplifiers. The amplifiers boost the received UL signals for filters which attenuate unwanted energy. In modulation, demodulators down-convert the UL signals from their carrier frequency. The analog/digital interfaces convert the analog UL signals into digital UL signals for the DSPs. The DSPs recover UL symbols from the UL digital signals. In DU 723 and CU 724, the CPUs execute the network applications to process the UL symbols and recover the UL signaling and data. In CU 724, the CPU executes the RRC to generate corresponding UL signaling and DL signaling. CU 724 transfers the UL signaling to a network controller over the backhaul links. CU 724 transfers the UL data to a data gateway over the backhaul links.

In CU 724, the XCVR receives DL signaling from the network controller and DL data from the data gateway. In CU 724 and DU 723, the CPUs execute the network applications to generate corresponding DL signaling and data. In CU 724 and DU 723, the CPUs execute the network applications to process the DL signaling and data to generate DL symbols that carry the DL signaling and data. In radio 722, the DSP processes the DL symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless signals that transport the DL signaling and data to the DUs.

The wireless data network circuitry described above comprises computer hardware and software that form special-purpose network circuitry to automatically configure a wireless network CU and multiple wireless network DUs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to automatically configure a wireless network CU and multiple wireless network DUs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve user communication devices that are located in a user structure, the method comprising:
   a user Centralized Unit (CU) located in the user structure exchanging test data with user Distributed Units (DUs) mounted externally to the user structure;
   the user DUs exchanging the test data with the user CU and wirelessly exchanging the test data with access DUs that are located in wireless Access Points (APs), wherein the access DUs wirelessly exchange the test data with the user DUs and exchange the test data with access CUs in the wireless APs;
   the user CU estimating data throughputs based on the test data for combinations of the user DUs, the access DUs, and the access CUs and selecting one of the combinations based on the estimated data throughputs;
   the user CU exchanging user data with the user communication devices and exchanging the user data with the user DUs in the selected one of the combinations; and
   the user DUs in the selected one of the combinations exchanging the user data with the user CU and wirelessly exchanging the user data with the access DUs in the selected one of the combinations, wherein the access DUs in the selected one of the combinations exchange the user data with the access CUs in the selected one of the combinations.

2. The method of claim 1 wherein the user CU estimating the data throughputs based on the test data for combinations comprises estimating the data throughputs based on Received Signal Strength (RSS) of the test data for the combinations.

3. The method of claim 1 wherein the user CU estimating the data throughputs based on the test data for combinations comprises estimating the data throughputs based on Received Signal Raw Power (RSRP) of the test data for the combinations.

4. The method of claim 1 wherein the user CU estimating the data throughputs based on the test data for combinations comprises estimating the data throughputs based on Signal to Interference and Noise Ratio (SINR) of the test data for the combinations.

5. The method of claim 1 wherein:
the user CU comprises Physical Layers (PHYs), Media Access Controls (MACs), Radio Link Controls (RLCs), Packet Data Convergence Protocols (PDCPs), Service Data Adaptation Protocols (SDAPs), Radio Resource Controls (RRCs), and a network router; and
the user DUs comprise Fifth Generation New Radio (5GNR) radios.

6. The method of claim 1 wherein:
the user CU comprises Packet Data Convergence Protocols (PDCPs), Service Data Adaptation Protocols (SDAPs), Radio Resource Controls (RRCs), and a network router; and
the user DUs comprise Physical Layers (PHYs), Media Access Controls (MACs), Radio Link Controls (RLCs), and Fifth Generation New Radio (5GNR) radios.

7. The method of claim 1 wherein:
the user CU comprises a network router;
the user DUs comprise a Physical Layers (PHYs), Media Access Controls (MACs), Radio Link Controls (RLCs), Packet Data Convergence Protocols (PDCPs), Radio Resource Controls (RRCs), and Fifth Generation New Radio (5GNR) radios.

8. The method of claim 1 wherein the access DUs comprise Physical Layers (PHYs), Media Access Controls (MACs), and Radio Link Controls (RLCs).

9. The method of claim 1 wherein the access CUs comprise Packet Data Convergence Protocols (PDCPs) and Radio Resource Controls (RRCs).

10. The method of claim 1 wherein:
the user CU comprises a network router; and
the user CU exchanging the user data with the user communication devices comprises the network router exchanging the user data with the user communication devices.

11. A wireless communication network to serve user communication devices that are located in a user structure, the wireless communication network comprising:
a user Centralized Unit (CU) located in the user structure and configured to exchange test data with user Distributed Units (DUs) mounted externally to the user structure;
the user DUs configured to exchange the test data with the user CU and wirelessly exchange the test data with access DUs that are located in wireless Access Points (APs), wherein the access DUs are configured to wirelessly exchange the test data with the user DUs and exchange the test data with access CUs in the wireless APs;
the user CU configured to estimate data throughputs based on the test data for combinations of the user DUs, the access DUs, and the access CUs and select one of the combinations based on the estimated data throughputs;
the user CU configured to exchange user data with the user communication devices and exchange the user data with the user DUs in the selected one of the combinations; and
the user DUs in the selected one of the combinations configured to exchange the user data with the user CU and wirelessly exchange the user data with the access DUs in the selected one of the combinations, wherein the access DUs in the selected one of the combinations are configured to exchange the user data with the access CUs in the selected one of the combinations.

12. The wireless communication network of claim 11 wherein the user CU is configured to estimate the data throughputs based on Received Signal Strength (RSS) of the test data for the combinations to estimate the data throughputs based on the test data for combinations.

13. The wireless communication network of claim 11 wherein the user CU is configured to estimate the data throughputs based on Received Signal Raw Power (RSRP) of the test data for the combinations to estimate the data throughputs based on the test data for combinations.

14. The wireless communication network of claim 11 wherein the user CU is configured to estimate the data throughputs based on Signal to Interference and Noise Ratio (SINR) of the test data for the combinations to estimate the data throughputs based on the test data for combinations.

15. The wireless communication network of claim 11 wherein:
the user CU comprises Physical Layers (PHYs), Media Access Controls (MACs), Radio Link Controls (RLCs), Packet Data Convergence Protocols (PDCPs), Service Data Adaptation Protocols (SDAPs), Radio Resource Controls (RRCs), and a network router; and
the user DUs comprise Fifth Generation New Radio (5GNR) radios.

16. The wireless communication network of claim 11 wherein:
the user CU comprises Packet Data Convergence Protocols (PDCPs), Service Data Adaptation Protocols (SDAPs), Radio Resource Controls (RRCs), and a network router; and
the user DUs comprise Physical Layers (PHYs), Media Access Controls (MACs), Radio Link Controls (RLCs), and Fifth Generation New Radio (5GNR) radios.

17. The wireless communication network of claim 11 wherein:
the user CU comprises a network router;
the user DUs comprise a Physical Layers (PHYs), Media Access Controls (MACs), Radio Link Controls (RLCs), Packet Data Convergence Protocols (PDCPs), Radio Resource Controls (RRCs), and Fifth Generation New Radio (5GNR) radios.

18. The wireless communication network of claim 11 wherein the access DUs comprise Physical Layers (PHYs), Media Access Controls (MACs), and Radio Link Controls (RLCs).

19. The wireless communication network of claim 11 wherein the access CUs comprise Packet Data Convergence Protocols (PDCPs) and Radio Resource Controls (RRCs).

20. The wireless communication network of claim 11 wherein:
the user CU comprises a network router; and
the network router is configured to exchange the user data with the user communication devices.

* * * * *